US010607411B1

(12) United States Patent
Pezzino et al.

(10) Patent No.: US 10,607,411 B1
(45) Date of Patent: Mar. 31, 2020

(54) SPECIALIZED GARMENTS FOR AUGMENTED REALITY AND METHOD

(76) Inventors: Kevin Pezzino, Amherst, NY (US);
Sandra P. Pezzino, Amherst, NY (US);
Maria E. Rodriguez, Buffalo, NY (US)

(*) Notice: Subject to any disclaimer, the term of this patent is extended or adjusted under 35 U.S.C. 154(b) by 1133 days.

(21) Appl. No.: 13/549,692

(22) Filed: Jul. 16, 2012

Related U.S. Application Data

(60) Provisional application No. 61/508,137, filed on Jul. 15, 2011.

(51) Int. Cl.
*G06T 19/00* (2011.01)
*H04N 1/00* (2006.01)
*G06T 7/33* (2017.01)

(52) U.S. Cl.
CPC .......... *G06T 19/006* (2013.01); *G06T 7/337* (2017.01); *H04N 1/00201* (2013.01)

(58) Field of Classification Search
None
See application file for complete search history.

(56) References Cited

U.S. PATENT DOCUMENTS

| | | | | |
|---|---|---|---|---|
| 4,916,634 A * | 4/1990 | Collins | ............... | A41H 3/007 700/132 |
| 6,091,482 A * | 7/2000 | Carter | ............... | G02B 27/2214 348/E13.029 |
| 6,882,897 B1 * | 4/2005 | Fernandez | ............... | A41H 3/007 2/905 |
| 7,817,104 B2 | 10/2010 | Rye et al. | | |
| 8,102,334 B2 | 1/2012 | Brown et al. | | |
| 8,145,998 B2 | 3/2012 | Leahy et al. | | |
| 8,434,674 B2 * | 5/2013 | Mangione-Smith | ............... | C07K 14/70503 235/375 |
| 2004/0096601 A1 * | 5/2004 | Raymond | ............... | B29C 67/0048 428/34.1 |
| 2007/0096909 A1 * | 5/2007 | Lally | ............... | G06K 7/0008 340/572.1 |
| 2008/0266323 A1 * | 10/2008 | Biocca | ............... | G06F 3/014 345/633 |
| 2011/0137706 A1 * | 6/2011 | Howard | ............... | G06Q 30/02 705/7.29 |

OTHER PUBLICATIONS

Bradley, Derek, Gerhard Roth, and Prosenjit Bose. "Augmented reality on cloth with realistic illumination." Machine Vision and Applications 20.2 (2009): 85-92.*

* cited by examiner

*Primary Examiner* — Bijan Mapar
(74) *Attorney, Agent, or Firm* — Vincent G. LoTempio; Kloss, Stenger & LoTempio; David T. Stephenson

(57) ABSTRACT

A method of augmenting reality of a physical garment, comprising the receiving of a demand from a user by a receptor to create an augmented garment from information about the physical garment and about a digital component to be linked to the physical garment. The information is organized according to at least one classification by the receptor, which sends the information to a production tracker for garment process distribution. The information is tested to ensure the digital component is functioning properly and is compatible with the physical garment. The physical garment is manufactured, and then blended with the digital component into the augmented garment, and finally delivered to the user.

19 Claims, 4 Drawing Sheets

SPECIALIZED GARMENTS FOR AUGMENTED REALITY AND METHOD

CROSS-REFERENCE TO RELATED APPLICATION

This application claims the benefit of U.S. Provisional Application No. 61/508,137, filed Jul. 15, 2011.

FIELD OF THE INVENTION

The present disclosure relates to clothing, apparel, body markings, and accessories that work with, respond to, and interact with computer applications and hardware devices, and a method of creating the same.

BACKGROUND OF THE INVENTION

Traditional garment design and clothing in general uses a wide range of images to decorate design and enhance its appearance. The function of those images is to make the garment a more attractive product to the person who wears it. However, today's garments are limited to their actual physical appearance, with little or no crossover application to the virtual world utilizing augmented reality.

Augmented reality is the process of extending information on top an existing environment using specialized software and hardware. It superimposes graphics, audio and other sense enhancements from computer screens onto real time environments. Augmented reality goes far beyond the static graphics technology of television where the graphics imposed do not change with the perspective. Augmented reality systems superimpose graphics for every perspective and adjust to every movement of the user's head and eyes.

Augmented reality is being used for many applications that relate to marketing, promotion and video games. However, the prior art has yet to apply augmented reality to something that is worn. By wearing a garment enhanced with augmented reality, creative doors are open to the field of costume design, fashion, and live avatar applications for video games that come from the person wearing the garment.

SUMMARY OF THE INVENTION

The present disclosure presents a virtual garment method which provides users with an innovative and never seen experience in which a physical garment design is extended to places that make it unique and customized for groups or individuals. The possibilities to communicate through physical and virtual garment design are endless. Garments become more than physical components on the human body, they can now be full-body objects that cover and interact with the individual from head to toe and can be projected without limitations 360 degrees around a user. Users can create garments that combine personal messages, individual forms of expressions, costume designs, fashion art design, art, commercial fashion, embedded messages, safety designs with specific information, individual publishing, storytelling, garment virtual video games, physical video games, role play games, virtual theater garments, educational garments, interaction garments that connect with other garments or people, educational garments, social interaction/networking, demonstrational garments, business and marketing, medical records, personal information from augmented garment or accessories, affiliation accessories, augmented jewelry, augmented body markings like tattoos or piercings, accessories, flags, banners, bags, underwear and any other wearable garment, object or accessory that interacts with the human body. Additionally groups can create garments with commercial and non-commercial purposes, interaction garments for data collection, information delivery garments for events and other activities, video messages, photo delivery, game interaction with groups, costumes, safety, sciences, identification garments, security garments, etc.

The main concept behind the augmented garment is not the novelty of an augmented experience. It is the content that makes a garment something more than a physical object, it is now a living entity that can be shaped and changed at any time with a custom solution to a group or individual.

The fashion world is the greatest place where designers aren't limited to create and expand from physical garments. With augmented garments any design is now possible. The method of the current disclosure makes it possible to create anything the artist desires, and anything the user enjoys. There are no limits to providing a signature to design and presence to almost any type of garment.

Organizations can benefit from garments that promote not only augmented apparel images but also offer interactivity and exchange of information through the garment. For example, charity organizations can promote their cause with effective designs that extend the message of the physical garment, but at the same time the charity can offer an opportunity to those who may want to support their cause with interactive opportunities, membership participation, or donations that can be triggered from the virtual side of the augmented garment.

In the case of sports clubs and other similar organizations the augmented garment is the perfect way to present a team to an audience, or individual messages such as an athlete's profile, team standings, etc., making the physical garment the perfect and natural platform to trigger the above information.

Other organizations such as schools and colleges find in the augmented garments a very effective way to expand from their traditional physical garment into an augmented "virtual apparel" garment which can offer memories, emotions, messages and designs that change the way the school community interacts with the garment and themselves. For example, a high school can request an augmented garment "virtual apparel" with a specific physical garment design, i.e. type of garment, material, color combinations, and sizes. Additionally the organization can provide information such as pattern design and color according to the needs of communication. Users can create their own pattern or images to be printed on a garment.

Once physical garment needs are determined, next is to understand the needs of communication for the augmented garment. An important part of the augmented garment is to provide an emotion and a change in the way people perceive the physical garment. Many users know and understand that their new "virtual apparel" is something that contains more than the simple physical information printed on it. They know their garment "virtual apparel" will make them look different, will bring memories, and excitement from their community, and may allow them to connect with each other after they are not part of the school any more. A simple photograph or a complex augmented design both have the same final intent, which is to make the garment an icon that is more than just fabric.

The method provided can also be more than simple photographs or videos. Three-dimensional animated objects can bring mascots to life. Learning can also be promoted through garments that present specific content. For example, human anatomy can be taught in ways much more visual, interactive and effective through augmenting classroom skeletons.

Augmented garments provide unlimited opportunities to fields such as theater, custom design, and entertainment. Users are presented with an augmented design in combination with a physical design. No matter the device used to extract the augmented garment the method is always the same. A garment is designed and manufactured with both physical and augmented components. Once the combination is implemented the presently disclosed method will facilitate different ways of interacting with the created augments garments.

These and other objects of the instant disclosure will be achieved by a method of augmenting reality of a physical garment, comprising the receiving of a demand from a user by a receptor to create an augmented garment from information about the physical garment and about a digital component to be linked to the physical garment. The information is organized according to at least one classification by the receptor, which sends the information to a production tracker for garment process distribution. The information is tested to ensure the digital component is functioning properly and is compatible with the physical garment. The physical garment is manufactured, and then blended with the digital component into the augmented garment, and finally delivered to the user.

BRIEF DESCRIPTION OF THE DRAWINGS

The disclosure is explained below by means of schematic drawings (see attached) and with additional details. The drawings include.

DETAILED DESCRIPTION OF THE INVENTION

Figure 1:
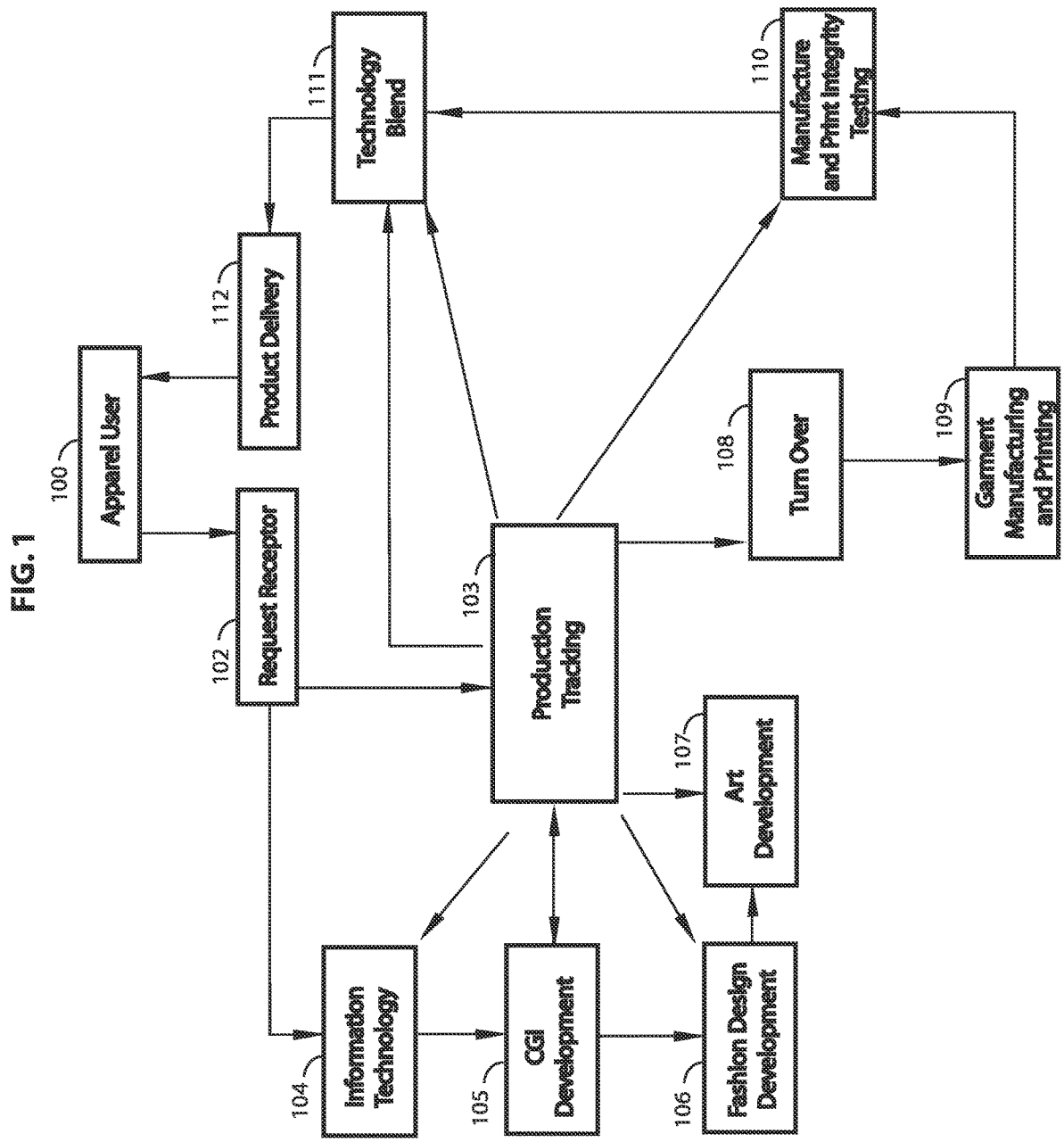
FIG. 1 is a block diagram of an augmented reality and garment system according to embodiments of the present disclosure.

Description of Specialized Garments for Augmented Reality

At the outset, it should be clearly understood that like reference numerals are intended to identify the same structural elements, portions, or surfaces consistently throughout the several drawing FIGS., as is further described or explained by the entire written specification of which this detailed description is an integral part. The drawings are intended to be read together with the specification and are to be construed as a portion of the entire "written description" of this invention as required by 35 U.S.C. § 112.

The present disclosure relates to garments which contain information to interact with technology. The contained information is presented in multiple unique ways and techniques that make the garment a new object different from any other. Images on garments are used as a source of traditional design and at the same time as source to release added information for augmented design. A series of techniques make the present disclosure unique and specialized for the garment development field.

The scope of the term "garment" is interpreted and construed broadly to mean any wearable item and/or accessory, shirt, pant, short, sweat shirt, sweater, sport jersey, hat, glove, skirt, khaki, glasses, scarf, tie, belt, face mask, socks, jacket, knee pad, shoulder pad, elbow pad, vest, wallet, umbrella, removable or permanent tattoo, cape, flag or any other icon that can be worn by a person. Garments can be made of any material found in the textile industry, organic, or synthetic material.

The present disclosure takes the garment to a completely new level. By utilizing and combining multiple existing technologies including garment creation, garment decoration and design, printing, lenticular technology, digital imaging, software technology and hardware technology, a new enhanced garment has been created. This specialized garment for augmented reality contains not only decorative content but many more including, but not limited to entertainment, fashion, educative, informative, scientific and in general any additional concept generated using augmented reality.

The present disclosure generally comprises a method of augmenting reality of a physical garment, comprising the receiving of a demand from a user by a receptor to create an augmented garment from information about the physical garment and about a digital component to be linked to the physical garment. The information is organized according to at least one classification by the receptor, which sends the information to a production tracker for garment process distribution. The information is tested to ensure the digital component is functioning properly and is compatible with the physical garment. The physical garment is manufactured, and then blended with the digital component into the augmented garment, and finally delivered to the user.

A preferred embodiment of the present disclosure is a method of converting a traditional garment into a new concept of clothing that contains physical, visual information and virtual added information that relies on the use of a software application and a hardware device. A garment may have one or multiple fixed images, or "patterns", placed precisely on specific non-traditional locations from which augmented reality comes to life by using a software application and seen through a mobile device or a PC or any other hardware device like a TV set or a headset. The augmented reality provides data, audio, video(s), image(s), and/or animation(s) that give the garment and the person who wears it a new representation that adds or changes their appearance partially or completely.

In reference to the present disclosure, "software application" refers to a computer-coded program which has been created to work specifically with a garment and a hardware device. "Hardware device" can refer to any of mobile devices, static devices, PCs, tablets, game consoles, TVs, displays or any other electronic apparatus.

In one preferred embodiment of the disclosure, the pattern (s) on the garment will be fixed using any available technique known in the art including printed, embroidered, attached or glued, in specific and unique places that will allow the hardware and software technology to align the projected images and configure a new representation that can be seen through the hardware device and software application in 360 degrees around the person wearing the garment.

In the preferred embodiment, patterns have a clear silhouette with defined contrast and color information. When the pattern has multiple elements that can be tracked it is a stronger image to be tracked by the software. The specific position and precise distance between patterns gives the hardware and software the correct information to compose a larger image on top of the garment. Pattern sizes depend on the printable space or the location that garments have. For example, smaller garments like hats, gloves, head bands, etc will have small patterns (approximately 1-2 inches). A pattern can be large (approximately 10-15 inches or even larger) if it is placed on a garment like a shirt, a cape, a flag, etc. The measurement takes the largest side of the pattern (width or height). A pattern can be small (approximately 1-2 inches of the smallest side, width or height) if the desired augmented image is to be seen at a close range (less than 5 feet). If the design is intended for a wide range image, in the preferred embodiment the pattern will be larger. Depending on the performance of the device capturing the pattern, the pattern can be larger or small, in some devices that distance can be greater than ten times the width of the pattern.

In the preferred embodiment, the size of the patterns is within a pre-determined size range to facilitate the hardware and software capturing the image. The actual size and range will change depending on the desired effect that the user wants the garment to produce. In the preferred embodiment for very close range patterns, the difference can be that the smallest pattern is no less than 20% the size of the largest pattern. For example if a larger pattern is 10" wide a small pattern cannot be less than 2" wide. Some limitations may happen in this case because the augmented image will need to fit those sizes. A preferred difference between two patterns is 50% the size of the largest pattern. For example a large 10" (largest side width or height) pattern may be combined with a pattern that is no less than 50% its size, that makes it a 5" pattern.

Pattern positions change depending on the garment, including between two garments that fit the same body part. For example an open jacket compared to a T-shirt: the T shirt can have patterns positioned on the central chest area and abdominal area compared to the open jacket will need to have makers on the sides of the chest or sides of the abdominal area. The desired augmented image may determine the position as well. A T-shirt design for an augmented costume may have different positioning of patterns compared to a T-shirt teaching human anatomy.

Patterns must be visible in order for the software and hardware to capture them. The positioning of the patterns is important to avoid un-intended blockage. Areas such as under the arms or between legs may limit the capturing of patterns. It is recommended to place said patterns forward or backward on the garment to avoid the blocking arm or leg.

In a preferred embodiment, the design of the garment and the design of the augmented images will be the factors determining the distance between patterns. Patterns can be next to each other but it is preferred that the patterns do not touch each other. A small distance between patterns is preferred. The larger the distance for the hardware device from the pattern, the larger the separation between patterns. It is preferred that proportionally the distance between patterns is not less than $1/16$ of the largest side of the smallest pattern.

There is no maximum limit to distance between patterns. The design of the garment and the desired augmented image will determine the maximum distance between patterns. In many cases but not always the effect is to provide a continuous augmented design that can be achieved by separated patterns. A continuous augmented design will allow people that wear the garment to turn around to let the software and hardware capture the patterns and provide a continuous 360 degrees design around the person.

Precision in alignment of patterns is based on the design of physical garment and the augmented image and their requirements. Depending on the type of garment and design of images the precise alignment of patterns will provide the synchronized continuity that the software and hardware requires to put two elements together in a precise location.

Some examples of usage of the preferred embodiment include, but are not limited to, augmented costumes, avatar creation for video game usage, virtual mask creations, virtual vehicles, objects and devices, virtual messages and expressions, and virtual content.

The location of the patterns is based on the specific design of the garment and the augmented reality projection that will come from it. Possible but not exclusive pattern locations in the present embodiment include the head, face, chest (center, left and right), back, neck (front, sides, back), shoulder, arm pit, belly area, flanks, upper back, scapular area, middle back, lower back, pelvic area, buttocks area, upper leg (front, sides and back), knee area, lower leg (front, sides, back), ankle, heel, dorsal surface and plantar surface of the foot, upper arm (sides, front and back), forearm (sides, front and back), elbow, wrist, hand (front and back) pocket, reverse side, flaps, collar, and folding surface.

In a preferred embodiment, each pattern is positioned precisely in order to more easily allow the hardware and software to detect the pattern. It is preferred that patterns are detected as flat as possible to allow for its recognition by the software and hardware devices. It is preferable that the patterns are placed in locations which avoid extreme wrinkling or stretching. In places like arm pit, knees or the spot behind the knee (knee pit) where wrinkling, folding or stretching are extreme, patterns can be printed on either side of the folding but not within the folding. At the moment when a user lifts up the arm or extends the leg the image will show as flat as possible.

Image detection software is very forgiving and allows for certain deformation of patterns. In the preferred embodiment, the software works by giving flexibility to distances between components within the pattern. While it is possible that software may lose track of patterns when images fold and cover themselves partially, the preferred embodiment of the disclosure will solve problems with blockage by other objects or even self blockage. At the same time, the software can recognize multiple garments simultaneously, which allows for complex video game applications, among other applications. In addition, the preferred embodiment of the disclosure provides a total 360 degrees full coverage augmented view of the garment.

The patterns can be made of different sizes with monochromatic, duotone or polychromatic designs. It is preferred, but not required, that patterns are of specific and rich design to provide a clear detailed silhouette that can be recognized by the software.

A garment can have a singular pattern that projects one unique augmented reality result or multiple patterns located in specific places on the garment according to the design. When multiple patterns are present they may be part of one complete design on the printed physical garment. In the multiple pattern scenario, the projected augmented data, audio, image(s), animation(s), and/or video(s) align with the other designs generating a bigger composition of elements that generates a message and an emotion in the person who looks at it through the hardware device and software application.

An example application of the preferred embodiment involves computer games and console video games. In general, many such games provide the user the option where they pick an avatar that represents him/her to compete against the machine or others. The users select an avatar that represents them when they are playing. By using augmented reality and the specialized clothing with patterns, the user can take the video game experience to the next level where they can wear the avatar themselves and play in a real, physical game against others aided by the augmented technology.

The present disclosure allows for a computer to put together a set of predetermined elements to create a new avatar. The specialized garment is the glue that makes the design stitch together. With no specialized garment there are not patterns for the software and hardware to attach the components together.

While the prior art may disclose other systems which attach avatars to a figure, only the specialized garment of the present disclosure provides a person who uses it a real design that is seen without a device and at the same time facilitates for the software and hardware to configure a new image on top.

Another application example of the preferred embodiment includes costumes. Costumes are popular garments that modify the appearance of the person who wears them. The present disclosure provides the opportunity to have a traditional costume with printed designs that have the same effect of a regular costume but at the same time allows software and hardware to recreate a new augmented costume on top of the first. This added concept connects with the intention of users to capture in a still image or in a video the augmented representation of the person who wears it.

Yet another application of the present disclosure lets users utilize imaginary or existing objects to create imaginary cars, ships, airplanes, spaceships etc. These objects are usually static. The preferred embodiment allows the software and hardware to generate a vehicle or object that can move with the users where they can see themselves wearing a garment that gives them a costume to be who they want to be and at the same time project through the software and hardware the vehicle or object they want to be in.

Still another application of the present disclosure allows entertainers to wear the specialized garments combined with the appropriate software and hardware to create new live characters with a different appearance to offer their audience a new a fresh look of their created characters.

Another embodiment of the disclosure reveals printed pattern(s) on the specialized garment made of combining two images exactly aligned in the same position using a lenticular technique to provide two source patterns. The software and hardware will project two sets of data, audio, images, videos or animations that may become one scene on the screen of the hardware. Lenticular images are images created by two or more images 'interlaced' together into a composite and mounted behind a lenticular lens. These images appear to be animated and possibly three dimensional depending on the artist's intentions.

The lenticular technique is similar to the barrier technique in the aspect that the viewer is subjected to a different image based on viewing position. It is preferable that the lenticular lenses are constructed out of acrylic or PET copolymers depending on usage needs.

The consistency and flatness of the lenticular lens makes it easier for the image to be recognized by the software and hardware devices. But because the lenticular lens works with the angle from where the viewer is looking at it, a method is disclosed where the viewer can use a printed card non-lenticular version of the two images within the pattern to allow the software recognize them separately before trying to register them from the garment. Patterns using the lenticular images become a source for multiple augmented scenes.

In the disclosed embodiment, software is already loaded with the pattern image, it only needs to find a flat printed image to connect the physical image on the garment with the image in the software. The hardware device captures the pattern from a physical flat surface. This technique is a back up technique in case the hardware device does not recognize the wrinkled uneven image printed on the garment the first time it looks at it. Once it has been loaded in memory there is no need to scan the printed card again. Users can also download the image from a website or even point their hardware device at the image on the screen of a PC to capture the image.

Some examples of applications of the present embodiment include dual augmented costumes, dual avatar creation for video game usage, dual virtual mask creations, dual virtual vehicles, objects and devices, dual virtual messages and expressions, and dual virtual content.

Computer and console video games use the costume and avatar definition of characters as separate elements in a user interface. With this technique, augmented reality video games can compose both augmented reality results from the original lenticular pattern. Multiple applications can come from this technique and they are not only linked to video games.

Educational and scientific applications can relate to the present technique where the patterns will allow the software and hardware to reveal two images that relate with each other. An example of this would be a skeleton under a body structure.

Specialized sports clothing can contain information of players, teams, or even sponsors. Using the lenticular technique, one pattern triggers a visual image while the second pattern triggers data.

Lenticular lens sheets are designed to enhance certain image characteristics. A lenticular lens sheet designed for flip images, as is the case in the present disclosure, will have a wider viewing angle (typically higher than 40°). Morph and animation images can be considered advanced flip images and will also benefit from a lenticular lens sheet with a higher viewing angle. Some lenticular lens sheets are designed with viewing angles between 30° and 40°.

It is preferable that patterns are as clear as possible to allow for the software and hardware to capture them. The larger the image the more difficult it is to capture. This limitation applies to lenticular images in general. A preferred embodiment takes advantage of one limitation the lenticular technique has: humans have two eyes to look at the lenticular images while the device has only one lens. Because our eyes are separate, the angle of vision to recognize a single image in the lenticular lens is smaller. The disclosed method uses a traditional hardware device with a single camera lens, which makes the angle for registration wider and therefore gives a higher chance of registration for the pattern.

Another embodiment of the disclosure presents one printed pattern on a specialized garment generating one augmented reality projection on the mobile device. At the same time, the first pattern will be composed of multiple secondary makers that when seen thorough the hardware device in close range it will project new image(s) generating a dual, triple or multiple designs. Examples of usage include: Micro-world vs. macro-world design, and macro views of a costume at a large distance and detailed images at a closer range.

The augmented reality technology has some weaknesses, one of them relates to the inability to registering patterns at a certain distance. When patterns are too small they lose their value as patterns and become only unidentified elements. The present embodiment utilizes this inherent weakness by combining multiple patterns that can be registered by the software and hardware devices as one main pattern at a long range from the garment and, at the same time when the device is close to the individual patterns they will generate their individual augmented data, audio, image(s), video(s) or animation(s).

The sensibility and performance of the hardware device is a crucial element which determines whether the software detect the patterns. When a maker becomes illegible to the software it will automatically look for the next pattern to load up a different data, audio, image(s), video(s) or animation(s). Printing quality of smaller patterns will also help determine the performance of the software and hardware.

Patterns are very effective when using DTG (Direct To Garment) technology which is the system of printing with a digital printer on the garment. Traditional silk screen technology is very effective too, the only limitation that it represents is when using polychromatic designs the registration of each of the printed colors on the fabric have to be consistent in all the garments to reduce poor tracking and registration of patterns. Other techniques like embroidery works too only that the rate of recognition reduces in smaller patterns due to the limitation of detail in small embroidered images. Other printing systems like offset on solid (non-fabric) flat patterns or digital printing are very efficient too.

In the preferred embodiment, the following are conditions that apply to fabric and any other materials: Non-stretchy. Patterns must be as consistent in proportions as possible. Garments with fibers that can expand or shrink after washing the garment may distort the pattern limiting its performance. Non-glossy. Patterns work better on flat non glossy materials. Reflections and highlights or any other effect that the environment can have to modify the image on a pattern can reduce its performance. Wrinkle-free. Materials that are bound to wrinkles can affect the quality of the pattern. Wrinkles can block partially the pattern deforming its initial appearance. Reduce-textured materials. Materials like wool that have a highly textured surface limit the performance for printed patterns. Patterns need to be larger to avoid the interference of the back ground material.

In yet another embodiment of the preferred disclosure, two or more garments with one or multiple patterns each one located in precise places allow the exchange of data, images, 3d models, animation, audio or video. The design, location and size of patterns will make of the garments a unique set. The set of garments of the present disclosure is meant to be worn by multiple people. Because these specialized garments are components of a set they can interact or exchange information from one to others. This exchange happens by physically removing the pattern from one garment and attaching it to other garment or it can happen by using the software application and hardware device. The exchange can generate an interaction in a video game fashion.

Examples of usage of the present embodiment include video games that allow two or more players compete facing each other in real life, but at the same time utilizing specialized garments to provide the software and the hardware with the information to process existing predetermined components.

Video games today have multiple modes of play, one of them is the multiplayer mode. When gamers play against each other they usually use controllers or they use consoles that capture their movement through a sensorial device. The console translates the captured data to the avatars (individuals) in the game. The present disclosure allows the use of augmented reality to compose games where each person who wears a specialized garment may hold a mobile device and can see the augmented reality version of the opponent(s) player(s). The specialized garments represent the real avatar and allow for the generation of a virtual avatar. Garments can interact with each other allowing players to swap patterns and at the same time modify their in-game design. When two garments are close together the technology in the software can generate additional data, audio, video(s) image (s) or animation(s) that enhance the play experience.

Other applications can be found in learning activities where multiple people wearing the garments can learn about each other and their differences. The combination of multiple garments in the same set generates all the content required for any learning activity.

Yet another embodiment of the disclosure allows for the specialized garments to have patterns on multiple sides of the garment (for example, on the interior and on the exterior). When the user reverses the specialized garment inside out, a new set of data, audio, image(s), audio, video(s), and/or animation(s) is projected through the software and the hardware. In garments that can be opened with any system like zipper, buttons, etc (example: jackets) the interior may contains different patterns than the exterior. Both sets of patterns can be combined in the creation of the augmented composition.

Video games and entertainment base the appearance of their characters (avatars) on a simple representation of their design. Characters and users are often locked to their look and design through their game experience until they can reset their appearance to start a new game. With the presence of patterns in the inside and outside of the specialized garments, the software is loaded with information to allow the user to flip their garment or simply unbutton it to modify the appearance of their character.

An example application of the present embodiment is video game software programmed to have a combination of designed patterns inside and outside a specialized garment to hold secret weapons or even messages that can be use seen or activated through the software and hardware.

Yet another application of the present disclosure involves entertainers using the patterns on each side of the garment (inside and outside) to display an additional set of information, audio, image(s), video(s), or animation(s).

A closed garment needs to be reversed to allow the interior patterns to be recognized by the software. A specialized garment that can be opened with any existing system like zipper or buttons allows the person wearing it to reveal one or more patterns for the software to register it. The opening of the garment can be done in a traditional or non-traditional location size and style.

Due to the characteristics of materials that garments are made of, patterns may not be completely flat. At the same time, patterns do not always appear the same because of wrinkling, folding and otherwise deformation of the image. The preferred embodiment of the disclosure uses a methodology to facilitate the initial capture of the patterns by the software and hardware devices. A preferred method requires the use of a card or printed version of the pattern on a flat non reflective surface. The user is asked to capture the flat printed pattern the first time he or she uses it. This is to allow the software to store the image in memory of the hardware and software and be able recognize it more easily a second time it sees it on a non flat surface like a garment.

Patterns have levels of recognition. Computer software processes each pattern to connect it to an existing image, animation, or video. Some patterns can be difficult for the software and hardware to recognize due to multiple unexpected characteristics of the pattern. However, pointing the hardware at a flat printed version of the same exact pattern can facilitate the capture of patterns that are of difficult perception for the software and hardware.

Another example of application of the present disclosure includes the pattern as an element to be worn directly on the skin. Temporary and/or permanent tattoos allow for the freedom of placement on direct skin. This technique allows an augmented message to be projected through the hardware device and the software without any fabric at all.

A tattoo can be used in places where clothing is not convenient or easy to handle. In places like the face the tattoo will allow the technology to project a mask directly on top of the users face. A tattoo is merely an image of decoration for the person who wears it. A maker placed as a tattoo makes the person who wears it not only decorated with it but can become a source of additional information that can be used by sports athletes, performers, video gamers or costumes.

Averting now to the drawings, a preferred embodiment of the disclosure is generally indicated in FIG. 1. FIG. 1 depicts a block diagram of an augmented reality and garment system according to embodiments of the present disclosure. Garment user 100 is any person or entity which requests the creation of an augmented apparel item. Garment user 100 initiates the process at request receptor 102 where the following method is to be applied.

A request is received from garment user 100 at request receptor 102 to get the process started. Request receptor 102 is a physical or digital location where garment user 100 provides all the data, visual and audio information to be compiled together to generate a customized augmented garment. The request contains very specific information about the physical garment(s) to be produced including: Apparel type, fashion design, printed design, purpose, material, printing technique to use, color, visual effect, and any other technical considerations. Additionally, the request includes the virtual information that is to be combined with the physical garment.

The information received at request receptor 102 can be a combination of multiple elements that are used to produce the augmented experience. Those elements may include but are not exclusive to data such as images, audio, video, animation, or 3-dimensional files.

Data is a component that may be static or dynamic information in which multiple layers and components can be used in combination with the garment. This data includes but is not exclusively made of databases, web components, streaming information, canned information, text information, statistical information, mathematical algorithms, educational content, books, and articles.

Images are a visual and static component that may include, but are not exclusively made of, photographs, drawings, paintings, illustrations, and other digitally generated visuals. The audio component may include music, voice, sound effects, noise, or any audio capture of natural and created sounds. Video is a visual component that contains captured, edited or unedited footage provided by garment user 100. Animation is a linear visual component of created sequences made digitally or by the use of any capturing technique, which may also include an audio component. Additionally, the 3-dimensional component accepts specific type of digital files created with a software and hardware. The 3-dimensional component includes static CAD models or animated CAD models. These 3-dimensional components can be created with the intent of a linear animated result, a static object, or an interactive sequence similar or equal to a video game.

From request receptor 102 the process is passed to two different steps: production tracker 103 and information technology 104. In production tracker 104, the request is monitored and coordinated to go through the different steps of production, including both digital and physical steps. Production tracker 103 looks for efficiency, functionality and results of the production throughout the present method.

Production tracker 103 verifies that request receptor 102 has passed information accurately to information technology 104. Production tracker 103 works with CGI development 105, fashion design development 106 and art development 108 to verify that the technology produces the digital information required to move to production to turn over 108. The production tracker 103 works with manufacturing and print integrity 110 to verify the results of the physical garment, and also works with technology blend 111 to confirm the accuracy and performance of technology and physical garment before a garment is released to garment user 100.

Information technology 104 captures the information provided by request receptor 102. Said information can be received in a digital or physical format. In the preferred embodiment, a web portal is used to capture such information as garment physical fashion design confirmation, garment physical graphic design, and garment augmented desired information including visual design, audio design, video or animation design, interactivity design or game flow, database infrastructure requirements, dynamic data information, static data information, and/or CAD information.

Information technology 104 coordinates with production tracker 103 to pass the acquired information to the appropriate steps in the process. Information technology 104 allows programmers and information technology specialists to process the acquired information in the manner of working with server management, software development, interaction with 3rd party information technology providers, and Database management. Information technology 104 delivers digital information to production tracker 103 for a final technology blend test. At the same time, information technology 104 takes the final printed product and fits the product back into its augmented process to replace the final pattern image/design/shape that will be used with the technology. It is possible that some of said images/designs/shapes are seen only at the moment of the final result, never before.

The next step of the method, CGI Development 105 relates to the development of computer generated images that can be 3-dimensional or 2-dimensional, according to the need of the request. The concept art comes from the art development 107. The re-creation of said concept art can be generated using standard or proprietary software and hardware. In the case of 3-dimensional images, the images need to comply with specific properties that will make them suitable for augmented reality and fashion design simultaneously as well as interaction with the physical garment. In the case of 2-dimensional images, the images still have to be planned according to the design of the garment and the implementation of the image in the augmented experience. 2-dimensional images may have to be still processed with specific characteristics that will fit them into a 3-dimensional environment of the augmented reality technology. CGI development 105 will also rely on art generated by art development 107.

The results of CGI development 105 are passed back to information technology 104 for adaptation and programming of experience. The results are in the form of digital data. Said results are also passed to fashion design development 106 for adaptation and testing of design.

Fashion design development 106 may require a fashion design component to handle non-standard garment configurations, such as in cases like costumes, customized outfits and specialized garments. A fashion designer will work directly with the information provided by CGI development 105, information technology 104, and art development 107. Fashion design development 106 designates the physical appearance, shapes, materials, colors, structures, patterns and modularity of the garments. The results of the fashion design process will be passed back to production tracker 103 in the form of digital data, physical prototypes, and physical or digital images.

Art development 107 participates in multiple steps of the development of the physical and augmented garment. As to the physical component, art development 107 participates with fashion design development 106 on the solution of images and patterns to be printed on the garments. Said solutions are achieved by processing the images to be used in both the physical and digital environments. The physical environment includes the printing and manufacturing technique that will be used to create the garment. Techniques include but are not exclusive to hand block printing, perrotine printing, engraved copper-plate printing, roller/cylinder/machine printing, stencil printing, screen printing, digital textile printing, or other techniques known in the art. The digital environment includes the adaptation of the image that will be tracked by augmented reality software and hardware. The images generated must comply with technical requirements that work on both technologies simultaneously, the physical garment manufacture and print as well as the augmented solution. Additionally, art development 107 creates concept designs for augmented CGI solutions and final production artwork that is passed back to production tracker 103 for turn over 108.

Turn over 108 is the step where all the physical aspects of the garment are packaged together to pass to manufacturing and print. Turn over 108 works with garment manufacturing and printing 109 to solve problems and create samples that can be tested by information technology 104 in combination with the augmented solution. Turn over 108 also oversees the quality assurance in the production process. At turn over 108 there is reported all the physical specifics of the garment, including design, material, color, structure, assembly, visibility, printing technique, and the like.

The method of augmenting a garment does not exist if there is no physical garment to trigger the virtual design. In the manufacturing process, a garment is engineered and designed for mass production. Design factors such as fabric type, color, ornaments, assembly technique, size and printed patterns must follow the detailed instructions provided by information technology 104 to ensure the garment will not only be functional as a physical garment but also be precise enough to facilitate participation in the interaction with the augmented garment and its garment user 100. Garment manufacturing and printing 109 techniques may vary from design to design, and have been described above in further detail. This step of the method does not exclude any of the possible manufacturing techniques that exist today to produce physical garments.

It is necessary to follow product quality assurance to maintain high standards in materials and designs in order to achieve the desired physical/virtual results. As a result, manufacture and print integrity testing 110 is as important as any other step in the process. Each garment needs to be tested to verify it matches the required technical information to work with the augmented information. Information required may include but it is not exclusive of location, size, color, pattern, contrast, texture, light, and similar features.

Once tested for quality assurance, it is necessary to take the printed garment and use the final image printed on the garment as the final pattern to blend it with the augmented reality information at technology blend 111. In the case of multiple patterns on the same garment, the final sizes of garments and location of designs (patterns) on the garments will require custom blending with the augmented information to ensure that the final augmented composition aligns precisely according to the initial design. A final quality assurance check including both the physical and augmented aspects of each garment is required before sending the garment to its final step in the process, product delivery 112.

At the final step of product delivery 112, it is necessary to deliver not only the physical garment to garment user 100 but at the same time any additional digital information which may include software applications, software operation instructions, digital images or physical instructions that the user needs to follow and obtain the design selected in the beginning of the process.

Figure 2:
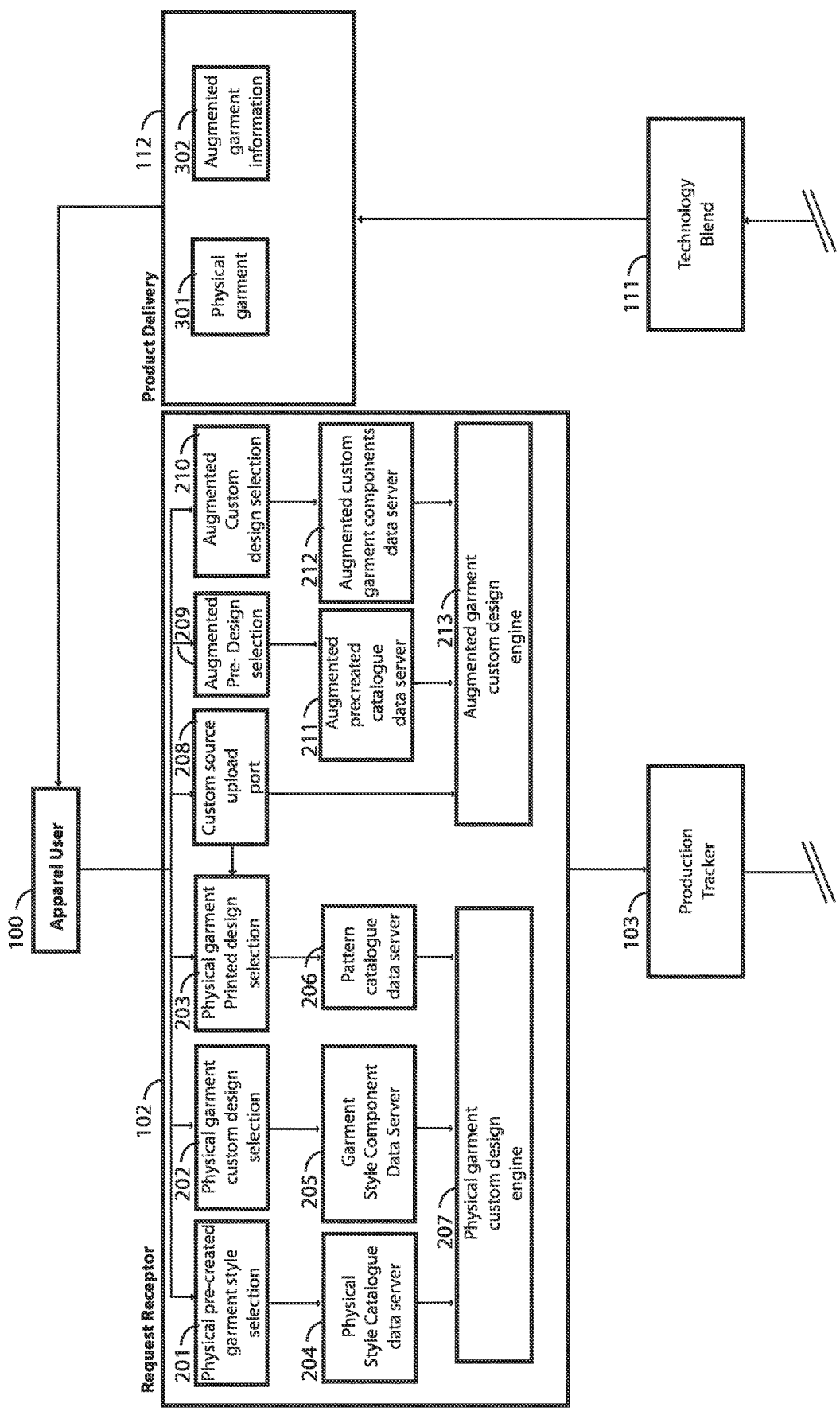
FIG. 2 is a block diagram of an augmented reality and garment system according to embodiments of the present disclosure.

Referring now to FIG. 2, there is illustrated a block diagram of an augmented reality and garment system according to embodiments of the present disclosure. FIG. 2 shows, in detail, the preferred method that is used to generate the request of the garment in which garment user 100 initializes the process with a request of a unique physical garment that is designed to work with an augmented/physical garment. Garment user 100 goes through a methodology that will allow them to request a desired augmented apparel item.

Garment user 100 initiates a process where the following method is to be applied. The methodology begins to be applied at the interaction between garment user 100 and request receptor 102. This is a process where multiple options are presented to garment user 100 and the combination of said options will generate the automated creation of an augmented garment. Request receptor 102 can be initiated through any means either a computer generated request a verbal or written request.

An augmented garment requires both a physical and an augmented garment. In physical pre-created garment style selection 201, garment user 100 selects a pre-created physical garment design that can be a traditional or non-traditional design. Pre-created refers to an existent garment design elaborated before the user chooses it. The selection will be from a limited group of physical garment solutions that have been created from a defined group of materials with a specific solution that has been created to work with augmented reality. Physical pre-created garment style selection 201 will take information from the physical style catalogue data server 204 to respond back to garment user 100. The physical garment design and shape may also be used to trigger the augmented apparel.

The pre-created garment style selection is based on physical style catalogue data server 204, which will store a database of garment designs. Physical style catalogue data server 204 contains pre-existing garment designs which are collected from traditional garment collections and from custom created garment collections that work specifically with augmented reality. Said collections are classified according to the type of garment based on the theme, design, scale, gender, user age, final usage, and its specific interaction with the augmented garment. Physical style catalogue data server 204 will also store information of structure, materials, colors, ornaments, manufacture and functionality.

If garment user 100 does not select a pre-created design, garment user 100 has the option to custom design a garment by choosing from a selection of pre-loaded components at physical garment custom design selection 202. The component options to create garments will be based on a limited group of components that allow multiple combinations in design, sizes, materials, ornaments and any other elements that can shape a garment. Physical garment custom design selection 202 will communicate with garment style component data server 205 to respond back to the garment user 100. In addition, the physical garment design and shape may be used to trigger the augmented apparel.

Garment style component data server 205 is a database which stores information related to multiple components offered to create custom physical garments. Garment style component data server 205 is organized by type of garment and manufacture characteristics of each component. The concept behind this database is that garment user 100 can choose any independent component that will interact with one or more components to give shape to a physical garment. Every combination is always planned to facilitate and improve augmented garment design. At the same time this allows garment user 100 to generate creative and unique solutions that relate to fashion and design. Components are also classified according to the type of garment based on the theme, design, scale, gender, user age, and its specific interaction with the augmented garment. Garment style component data server 205 will also store information of structure, materials, colors, ornaments, manufacture and functionality.

The garment components are parts that require one or more separate pieces to be assembled as a unit. Garment components are the basic sections of garments including top fronts, top backs, bottom fronts, bottom backs, sleeves, collars/neckline treatments, cuffs/sleeve treatments, plackets, pockets, and waistline treatments. Stitches, seams, and/or bonding are used to assemble components and final garment structure. Components such as collars, cuffs, and pockets are small parts attached to the major garment components (tops, bottoms, and sleeve) to facilitate manufacturability of the garment. The particular solution offered by a component involves consideration of functional use of the physical and augmented garment, aesthetics, quality, complexity, materials, component shape, sequence of assembly operations, and costs.

Top front, top back, bottom front, bottom back are the major sections of a garment. Fronts and backs may be one or more pieces depending on the styling of the garment. Left and right sections are frequently mirror images of each other but may be different if the garment is asymmetrical. Sometimes side seams are eliminated so that fronts and backs are one piece. Fronts and backs often have other components attached to them before the garment is assembled.

Sleeves are fundamental parts of a garment design, silhouette and fit. Sleeves are functional in covering all or part of the arm. Sleeves also provide opportunities for creative styling, frequently with additional components, such as sleeve plackets and cuffs attached. Sleeves also offer the opportunity to add forms, patterns, and images that can trigger augmented garment designs.

Plackets provide a finished opening in the garment to allow a body part to pass through. Types of placket formations and methods of assembly vary widely in quality, and design. Plackets often require some type of closure. Plackets offer unique opportunities for inside parts of the garment to be seen from the outside and at the same time generate augmented design opportunities.

Collars and other neckline treatments, such as facings and knitted bands, may finish, support, and provide aesthetic emphasis for the neckline of a garment. Neckline treatments may also involve closures and plackets to allow the head to pass through and still maintain a close till at the neck. From collars multiple opportunities for augmented combinations offer extended designs that can project to the head or around the neck area.

Cuffs and other sleeve treatments are components used to finish the lower edges of sleeves. Cuff type varies with the style, and function of the component and garment, materials used and methods of assembly and attachment.

Pockets may be functional, aesthetic, or both. They may be sewn onto garment parts, cut into the body of a garment, or incorporated into garment structure. Pocket treatment may also involve a closure. Pockets are sometimes used as a means of differentiating brands of products, particularly on jeans.

Waistline treatments include components that serve to define the waistline of a garment, provide entrance to a garment, and/or hold a garment in place on the body. Waistline treatments may involve formation or application of bands, casings, facings, and elastic. They may or may not involve a waistline seam.

Once the physical garment design is determined a printed pattern needs to be selected. The augmented reality garment requires the printed patterns/design to trigger the augmented garment. At the physical garment printed design selection 203, garment user 100 selects a pattern from a pre-created library and will determine its location based on the physical design of the garment. Garment user 100 will be able to select an existing pattern(s), the color(s), the size and modulation of the garment. A set of rules will apply to guarantee the functionality of the augmented garment.

Pattern catalogue data server 206 provides the supporting information to physical garment printed design selection 203. Pattern catalogue data server 206 stores all the possible pre-created images that can be printed on the physical garment and can be used by a user to customize a physical garment. Pattern is referred to as any image or visual representation that can be physically printed on a surface and that can be seen or detected by a device with a camera. Said patterns need to comply with specific characteristics to trigger an augmented garment. Patterns are classified according to their functionality on the physical garment. For example if a pattern is needed to be placed on the front panel of a garment it will be shaped with certain form, limited to certain scale and conditioned to some technical printing limitations so that it can be used on the intended component of the garment, in this case patterns are classified under front panel patterns. Under the functionality classification patterns are organized by theme, visual structure and technique used to create the patterns. Pattern color options are limited by their interaction with the garment's materials, and pattern placement is also limited by its functionality with the augmented reality technology.

Pattern catalogue data server 206 allows users to upload their own patterns building on the catalogue offered to other users through the custom source upload port 208. Since users can upload their own patterns, it is important that patterns are not limited to the data server possibilities because users help on building the library of patterns to be used.

Physical garment style custom design engine 207 combines all the previous options chosen by garment user 100 and puts them together in a single physical apparel design that will be ready to be created and interact with the augmented component of the garment yet to be prepared. Physical garment style custom design engine 207 may be a combination of software applications that allows for the customization of the garment. Once physical garment style custom design engine 207 assembles the design it will process the design to production tracer 103.

Custom source upload port 208 allows garment user 100 to provide their own patterns to be printed, attached, glued, and sewn to the physical garment. Patterns have limitations as mentioned above and users have to follow specific guidelines to upload their own design of patterns. Patterns can be digital images that are classified in bitmap images or vector images. The formatting of said options determines the technique used to print the image on the garment.

At the same time garment user 100 can provide their own digital assets to compose the augmented garment. Custom source upload port 208 allows for the submission of different formats that cover 2-dimensional photographs, 2-dimensional videos, streaming videos, 3-dimensional objects or animations, 2-dimensional interactive applications or even 3-dimensional interactive applications. Custom source upload port 208 provides data to pattern catalogue data server 206 for adding patterns to the physical garment and also to augmented garment custom design engine 213 to determine the augmented garment design.

Next, garment user 100 is asked to choose a pre-designed augmented reality experience at augmented pre-design selection 209. This step provides the information to use an asset that has been developed previously and that has been proved to work as an augmented apparel piece. Pre-created assets offer multiple types of assets but are inclusive of the following: photographs, video, slide shows, interactive 2-dimensional applications, 2-dimensional animated applications, 3-dimensional objects, 3-dimensional animated objects or characters, 3-dimensional interactive applications, video games, web applications, and animated special effects such as fire, water, and the like.

The augmented pre-created catalogue data server 211 stores data available for augmented pre-design selection 209. Assets are classified by their functionality, by type of augmented experience, theme, and design style. Functionality refers to the asset being created to be used in a specific augmented location in relation to one or multiple physical garments. Illustrative types of augmented experience include illustration, photography, video, 3-dimensional, animation, audio, interactive, data containers, or web. Theme examples include sports, entertainment, characters, music, and faith. In addition, multiple options of design styles are offered. All the assets in augmented pre-created catalogue data server 211 are considered finished and ready to be implemented. Format and type of information are current to technology and do not limit any new possible image format.

At augmented custom design selection 210, garment user 100 is allowed to select the augmented assets that are combined to generate an augmented reality garment that interacts with the designed physical garment. Composing a garment means taking pre-created individual assets and combining them in a specific way to produce a new augmented experience. Said pre-created assets are provided by the augmented custom garment components data server 212 or by the garment user 100. It is possible that some pre-created assets will still allow garment user 100 to add certain custom elements to the combination, for example a user can select a pre-created 3-dimensional model that uses photography as part of the design. Garment user 100 is still allowed to add his/her own image to combine with the pre-created design.

Augmented custom design selection 210 receives information from custom source upload port 208 and from the augmented custom garment components data server 212. The selection process is programmed by the functionality and interaction of the augmented asset with the physical garment. Augmented custom design selection 210 also considers the placement of the augmented asset in relation to the physical garment.

Augmented custom garment components data server 212 stores all the separate digital assets that can be used in the augmented composition. Said components are all those parts that can be combined to generate one or more garments. Assets are classified in different groups, such as by type of augmented experience including illustration, photography, video, 3-dimensional, animation, audio, interactive, data containers, and web. Each one of said groups can be subdivided by themes such as sports, entertainment, characters, music, faith, etc. Said individual themes have their own subdivisions by functionality allowing garment user 100 to mix and match components in the next step of the method, augmented garment custom design engine 213.

Augmented garment custom design engine 213 combines all the previous options chosen by garment user 100 and puts them together in a single augmented garment design that will be ready to be created and interact with the physical garment chosen from steps 201 through 207. Augmented garment custom design engine 213 may be a combination of software applications that allows for the customization of the augmented garment. Once augmented garment custom design engine 213 assembles a design it will process the appropriate information to production tracker 103, where physical and augmented designs are processed.

Figure 3:
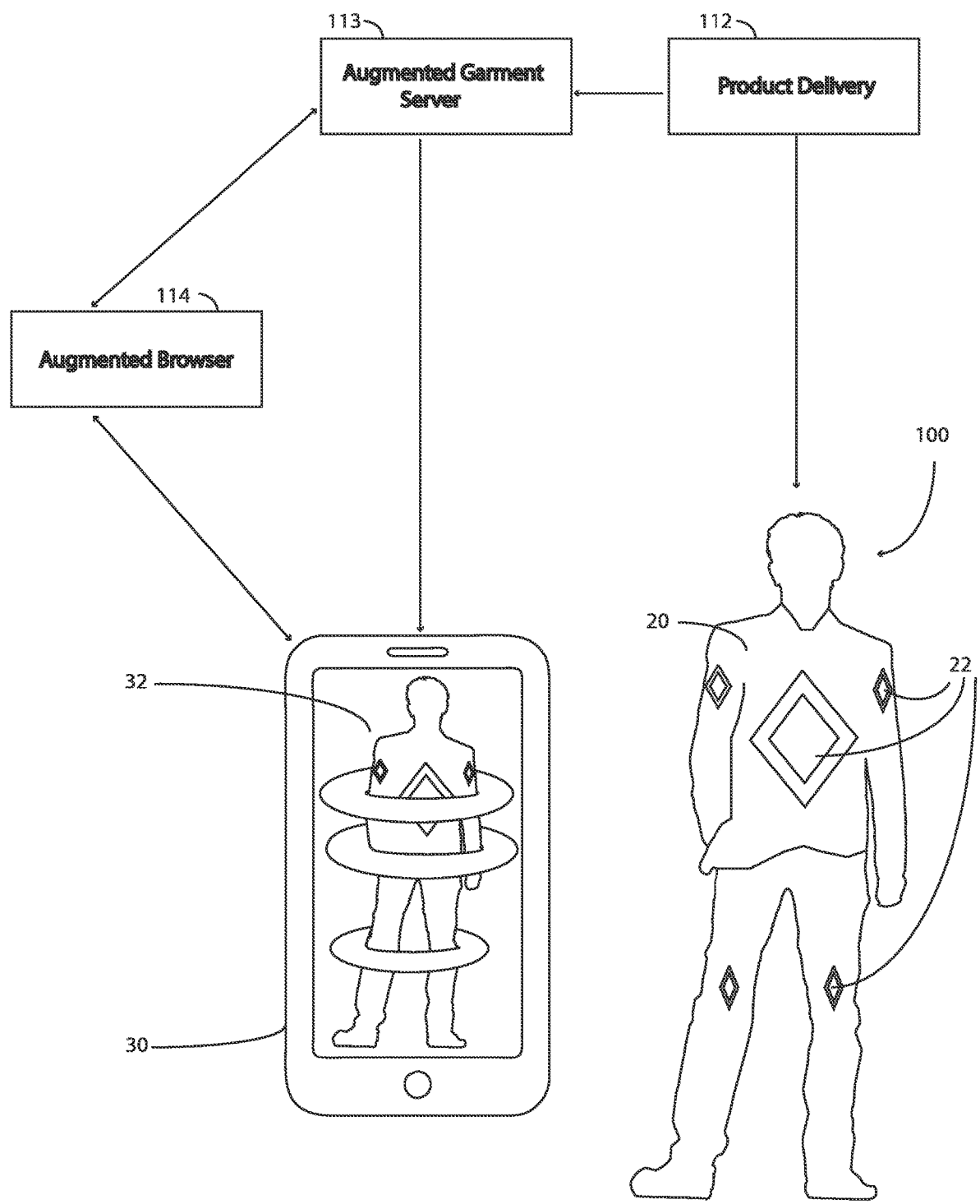
FIG. 3 sets forth a diagram for an augmented reality and garment system according to embodiments of the present disclosure

Referring now to FIG. 3, there is depicted a diagram for an augmented reality and garment system according to embodiments of the present disclosure. The delivery of the physical and augmented garment follows a flow of events to achieve a final functional augmented/physical garment, starting with product delivery 112. The process begins with the delivery of physical garment to garment user 100; simultaneously there is virtual delivery through the passing of information to garment user 100 in which he/she is instructed to obtain an application that decodes and works on a device to generate the augmented garment from the physical garment. A device is referred as the combination of a hardware and software that has the capability of processing Augmented Reality technology.

In the preferred embodiment, there exist two different possibilities to deliver the augmented reality information on augmented garment server 113. In the first instance, a self-contained application published on a public or private data server in which the static or dynamic content of augmented garment is included. Said application has in it all the components necessary to make the augmented garment work with the physical garment and does not connect back to any other server to retrieve additional information related to the garment.

In the second instance of the preferred embodiment, garment user 100 may receive a link to an application (or browser) that reads augmented published data as a public or private online site (similar to a website) in which the static or dynamic content of their garment is not present within the application but rather streamed through it. Additionally, the augmented reality information can be modified or updated if that was the original intent of the garment.

With the application and the physical garment 20 delivered, garment user 100 is ready to point (or look at) the garment through device 30. The result is the recognition by the hardware and the software of physical garment 20 and its patterns or patterns 22 to make visible and audible the final augmented/physical garment as one cohesive image 32.

Figure 4:
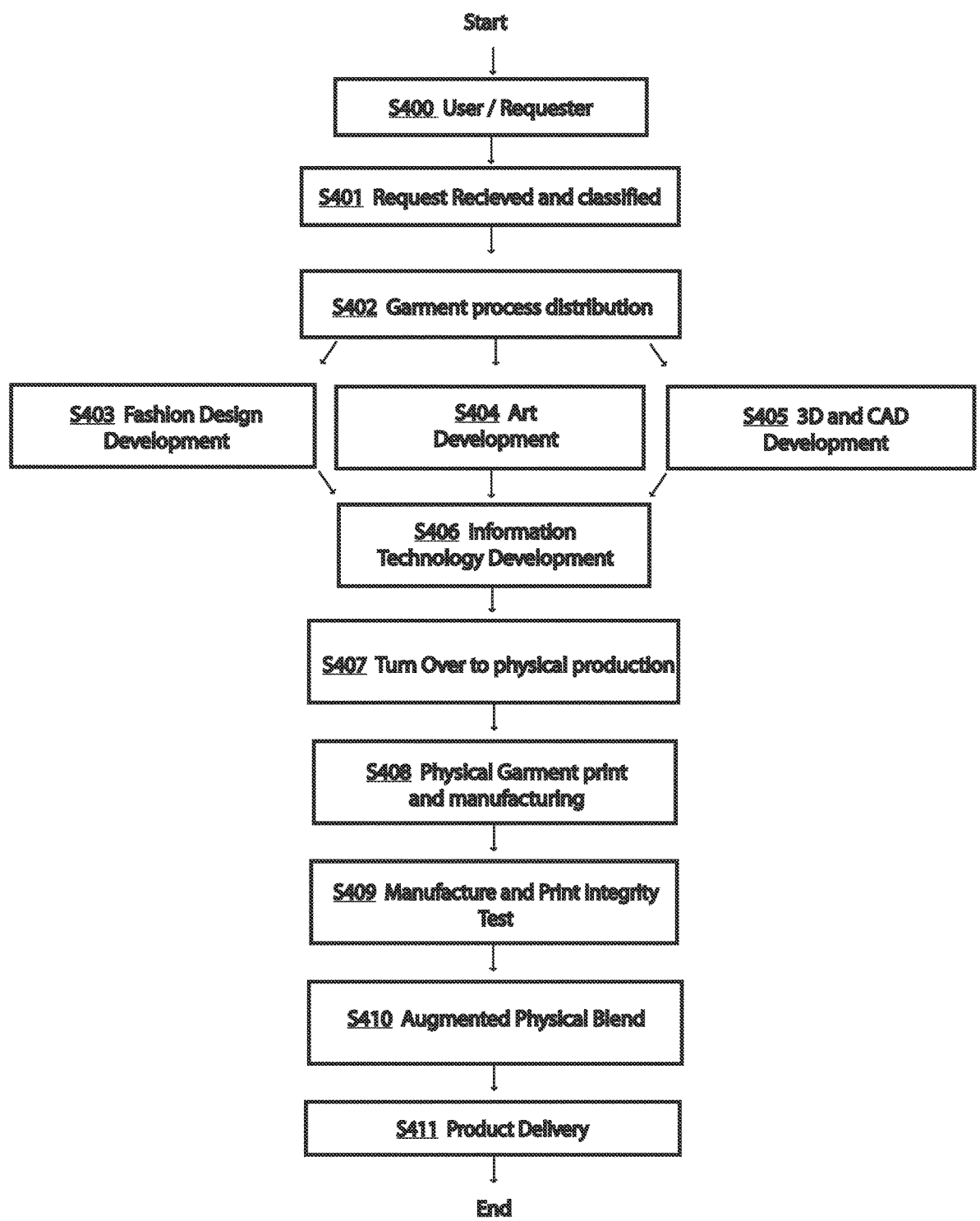
FIG. 4 is a flowchart of an augmented reality method for specialized garments according to an embodiment of the present disclosure.

Referring now to FIG. 4, there is depicted a flowchart of an augmented reality method for specialized garments according to an embodiment of the present disclosure. At S400, garment user 100 initiates the process. Garment user 100 provides information to choose the type of physical garment and digital component to be combined to create an augmented garment. A request method allows garment user 100 to choose between pre-created physical/augmented garments or custom physical/augmented garments or a combination of the two.

A receptor gathers all the choices made by garment user 100 at request received and classified S401 to organize the choices into classifications determined by the fashion of the requested physical garment, by the type of requested digital component, by theme, visual structure, technique of creation of the augmented garment, or any other type of classification according to aesthetic or functional properties. It should be understood that these classification types are only limited by the imagination of the users and/or content creators. The choices are packaged together to create a full garment unit process. Request received and classified S401 in the process is handled by the combination of multiple tools that allow for the composition of an augmented physical garment. A package request is sent to a production tracker where garment process distribution S402 takes place.

From garment process distribution S402, depending on the type of package request, the process distribution varies. A package request can either be for a pre-created physical design and/or digital component already residing on the system server, for a custom physical design or digital component newly created by the user, or from some combination created by the user. For a custom requested design, the process distribution will go through some combination of fashion design development S403, art development S404, and/or 3D and CAD development S405, and then to information technology development S406 for testing to ensure the digital augmented pre-created components are functioning properly and the garment is functioning for manufacturing. If the request demand from the user is a pre-created physical garment combined with a pre-created augmented design, the process is sent directly to information technology development S406.

If the request demands a pre-created physical garment in combination with a custom augmented design, the process is sent to 3D and CAD development S405 to prepare any custom 3D data that needs to be aligned to the physical design. Augmented designs need preparation in terms of location, creation, scale, texture, color, geometry adaptation and effect to be used in conjunction with the physical design based upon the augmented reality technology. Once 3D and CAD development is prepared, the process proceeds to information technology development S406, however in some cases art development S404 may be needed depending on the type of custom request.

If the request of a user demands a pre-created physical garment in combination with a custom source design of a digital component uploaded by the requester, the process is sent to art development S404 for preparation of any uploaded source media and then to the 3D and CAD development S405 to prepare any custom 3D or CAD data that needs to be prepared for augmented technology usage. Once 3D and CAD development S405 is finished, the process is passed to information technology development S406.

If the request demands a custom design physical garment combined with a pre-created augmented design the process is sent directly to two different steps of the process: fashion design development S403 to prepare the custom designed components for production of the garment, and then to information technology development S406 to ensure the digital augmented pre-created components are functioning properly.

If the request is for a custom physical garment design combined with a custom augmented design, the process goes to fashion design development S403 for preparation of the predesigned components and to 3D and CAD development S405 to prepare any custom design data that needs to be prepared or designed for the virtual garment. Once 3D and CAD development S405 is finished, the process is passed to information technology development S406.

If the request is for a custom physical garment design combined with a custom source design uploaded the by garment user 100, the process is sent to fashion design development S403 for preparation of the pre-designed components, then to art development S404 for preparation of any uploaded source media, and finally to 3D and CAD development S405 to prepare any custom design data that needs to be adapted for augmented technology usage. Once all these components have been prepared, the process goes to information technology development S406 for final assembly of the augmented garment.

Once the physical garment design and preparation are ready, the process continues to manufacturing and printing. Turn over to physical production S407 verifies that all information and components requested in the design are clearly set for manufacturing of the physical garment. Turn over to physical production S407 comprises the steps of scaling, sizing, assembling, coloring, printing, and aligning of patterns and accessories. Turn over to physical production S407 is also in charge of the engineering aspect of the physical garment. All the manufacturing questions and processes are answered and defined to distribute the garment to the correct process for manufacturing. In case of defective design or unclear solution, the flow is returned to garment process distribution S402.

Once all the above checks are completed, the process moves on to physical garment print and manufacturing S408. The manufacturing process can have multiple solutions and many of them just usable within the technology and materials utilized to create a physical garment. Although the present disclosure includes manufacturing as a part of the method to develop an augment garment, the disclosure does not specify a single process or technique to be unique to the creation of physical garment in combination with the augmented garment. At the same time, the instant method does not exclude any possible existing or new technology to be used in the creation of garments.

After the physical garments have been manufactured, it is necessary to verify that they follow all the fashion design guides, as well as all the requests made by garment user 100. Manufacture and print integrity test S409 verifies that physical components are combined correctly and that all triggering components of the augmented garment are correctly placed, printed, manufactured. Additionally, quality assurance testing is part of manufacture and print integrity test S409 to ensure that garment user 100 will receive a fully finished and functional product according to his/her original intent.

Since the augmented garment requires a digital form of the physical shape and pattern design of the physical garment, augmented physical blend S410 is necessary to assemble and fine-tune the interaction between the physical and digital ends. In cases such as custom designs for physical and augmented garments, it is necessary to verify tracking, aligning, scaling, and coloring as applied to the augmented components of the garment in combination with the physical components of the garment to compose the one single garment design. Augmented physical blend S410 requires the participation of information technology S406 and fashion design development S403 to assure the final composed garment is fully functional as a unit.

Product delivery S411 is the final step of the present disclosure. The final garment is delivered to garment user 100 including any necessary information described above to ensure the functionality of the physical and the augmented garment.

While a preferred form of this disclosure has been described above and shown in the accompanying drawings, it should be understood that applicant does not intend to be limited to the particular details described above and illustrated in the accompanying drawings, but intends to be limited only to the scope of the invention as defined by the following claims. In this regard, the term "means for" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

The invention claimed is:

1. A method of augmenting reality of a physical garment, the method comprising:
   generating a physical garment by interlacing at least two individual images to form a lenticular composite;
   mounting the lenticular composite behind a lenticular lens sheet to form a lenticular image;
   placing at least one lenticular fiducial marker in each of the at least two individual images, wherein each of the at least two individual images contains a different at least one lenticular fiducial marker;
   providing at least two sensors on at least one device, wherein each sensor is capable of simultaneously detecting the different at least one lenticular fiducial marker;
   detecting with each sensor at least one lenticular fiducial marker;
   receiving a demand from a user by a receptor to create an augmented garment from information gathered about said physical garment and about a digital component to be linked to said physical garment;
   organizing said information according to at least one classification by said receptor;
   sending said information to a production tracker for garment process distribution;
   wherein said process distribution includes the steps of tracking, aligning, scaling, and coloring said digital component in combination with said physical garment for production of said augmented garment;
   testing said information to ensure said digital component is functioning properly and is compatible with said physical garment;
   creating a digital representation of said physical garment;
   blending of said physical garment with said digital component into said augmented garment wherein said blending includes verifying, with said digital representation, said steps of said tracking, said aligning, said scaling, and said coloring said digital component in combination with said physical garment after production of said augmented garment;
   wherein the physical garment is comprised of at least two lenticular images interlaced together to form a composite and mounted behind a lenticular lens sheet;
   digitally customizing a physical garment template, wherein a first level of customization includes creating triggering components in a design associated with the physical garment;
   wherein a second level of customization involves developing 3D and CAD data elements geometrically adapted for compatibility with the physical garment to be stored as digital assets in a data server for alignment with the design and,
   wherein the 3D augmented design and the surface surrounding the 3D augmented design are delivered to the user on a screen.

2. The method of claim 1, wherein said delivering includes a server, a browser and a display device.

3. The method of claim 1, wherein said receptor includes a content creator.

4. The method of claim 1, wherein said information is chosen from a pre-created physical garment design combined with a pre-created digital component design.

5. The method of claim 1, wherein said information is chosen from a pre-created physical garment design combined with a custom digital component design; and
   preparing any 3D or CAD data from said custom digital component design.

6. The method of claim 5 further comprising:
   preparing said custom digital component design to be used in conjunction with said pre-created physical garment design based upon location, creation, scale, texture, color geometry adaptation and effect.

7. The method of claim 1, wherein said information is chosen from a pre-created physical garment design combined with said digital component, whereby said digital component is uploaded by said user;
   preparing said uploaded digital component: and
   preparing and aligning art for custom 3D or CAD data for augmented technology usage with said physical garment.

8. The method of claim 1, wherein said information is gathered from a custom physical garment design combined with a pre-created digital component design;
   preparing fashion development of said custom physical garment design for production of said augmented garment; and ensuring said digital component is functioning to match the the physical garment.

9. The method of claim 1, wherein said information is chosen form a custom physical garment design combined with a custom digital component design;
   preparing fashion development of said custom physical garment design for production of said augmented garment; and
   preparing any 3D or CAD data from said custom digital component design for production of said augmented garment.

10. The method of claim 1, wherein said information is chosen from physical garment design combined with said digital component, whereby said digital component is uploaded by said user;
- preparing fashion development of said custom physical garment design of production of said augmented garment;
- preparing said uploaded digital component; and
- preparing and aligning art for custom 3D or CAD data for augmented technology usage with said physical garment.

11. The method of claim 2, wherein said blending is preformed by a content creator and said tracking, aligning, scaling, and coloring is synchronized so that there is continuity between said digital component and said physical garment for production of said augmented garment.

12. A method of augmenting reality of a physical garment, the method comprising:
- generating a physical garment by interlacing at least two individual images to form a lenticular composite;
- mounting the lenticular composite behind a lenticular lens sheet to form a lenticular image;
- placing at least one lenticular fiducial marker in each of the at least two individual images, wherein each of the at least two individual images contains a different at least one lenticular fiducial marker;
- providing at least two sensors on at least one device, wherein each sensor is capable of simultaneously detecting the different at least one lenticular fiducial marker;
- detecting with each sensor at least one lenticular fiducial marker;
- receiving a demand from a user by a receptor to create an augmented garment from information gathered by each sensor about said physical garment and about a digital component to be linked to said physical garment;
- organizing said information according to at least one classification by said receptor;
- sending said information to a production tracker for garment process distribution;
- wherein said process distribution includes the steps of tracking, aligning, scaling, and coloring said digital component in combination with said physical garment for production of said augmented garment;
- testing said information to ensure said digital component is functioning properly and is compatible with said physical garment;
- creating a digital representation of said physical garment;
- blending of said physical garment with said digital component into said augmented garment wherein said blending includes combining data detected b each sensor, verifying, said digital representation, said steps of said tracking, said aligning, said scaling, and said coloring said digital component in combination with said physical garment after production of sand augmented garment;
- digitally customizing a physical garment template wherein a first level of customization includes creating triggering components in a design associated with the physical garment;
- wherein a second level of customization involves developing 3D and CAD data elements geometrically adapted for compatibility with the physical garment to be stored as digital assets in a data server for alignment with the design, wherein 2D images are processed with specific characteristics that will fit them into an augmented 3D environment;
- wherein a third level of customization includes recognizing triggering components, wherein to compensate for garment blockage not all triggering components are required to be recognized for triggering and
- wherein the 3D augmented design and the surface surrounding the 3D augmented design are delivered to the user on a screen.

13. A method of augmenting reality of a physical garment, the method comprising:
- generating a physical garment by interlacing at least two individual images to form a lenticular composite;
- mounting the lenticular composite behind a lenticular lens sheet to form a lenticular image;
- placing at least one lenticular fiducial marker in each of the at least two individual images, wherein each of the at least two individual images contains a different at least one lenticular fiducial marker;
- providing at least two sensors on at least one device, wherein each sensor is capable of simultaneously detecting the different at least one lenticular fiducial marker;
- detecting with each sensor at least one lenticular fiducial marker;
- receiving a demand from a user by a receptor to create an augmented garment from information gathered by each sensor about said physical garment and about a digital component to be linked to said physical garment;
- organizing said information according to at least one classification by said receptor;
- sending said information to a production tracker for garment process distribution;
- wherein said process distribution includes the steps of tracking, aligning, scaling, and coloring said digital component in combination with said physical garment for production of said augmented garment;
- testing said information to ensure said digital component is functioning properly and is compatible with said physical garment;
- creating a digital representation of said physical garment;
- blending of said physical garment with said digital component into said augmented garment wherein said blending includes combining data detected by each sensor, verifying, with said digital representation, said steps of said tracking, said aligning, said scaling, and said coloring said digital component in combination with said physical garment after production of said augmented garment;
and
- wherein the 3D augmented design and the surface surrounding the 3D augmented design are delivered to the user on a screen.

14. The method of claim 13, further comprising capturing printed card image versions of each of the at least two individual images to allow the software recognize each of the at least two individual images separately before registering the at least individual images from the physical garment.

15. The method of claim 13, wherein the lenticular lens sheet is constructed out of at least one of acrylic and PET copolymers.

16. The method of claim 13, wherein the lenticular lens sheet has a viewing angle higher than 40 degrees.

17. The method of claim 13, further comprising capturing with a hardware device flat, non-lenticular image versions of each of the at least two lenticular images to allow the software recognize each of the at least two lenticular images separately before registering the at least two lenticular images from the physical garment.

18. The method of claim 13, further comprising manufacturing of said physical garment.

19. The method of claim 13, wherein the number of sensors is at least two.

* * * * *